No. 753,011. PATENTED FEB. 23, 1904.
L. A. STEYNE.
HOT AIR AND HOT WATER FURNACE.
APPLICATION FILED SEPT. 18, 1903.
NO MODEL. 4 SHEETS—SHEET 4.
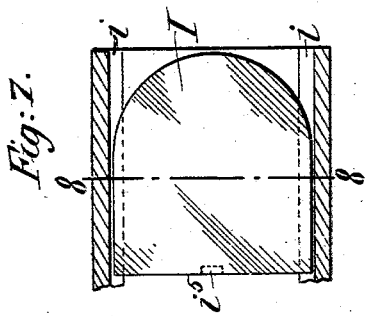
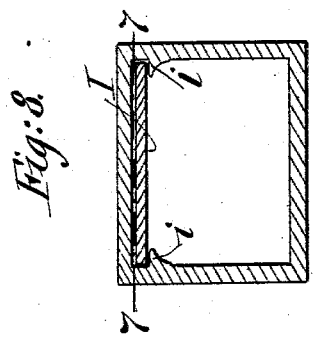
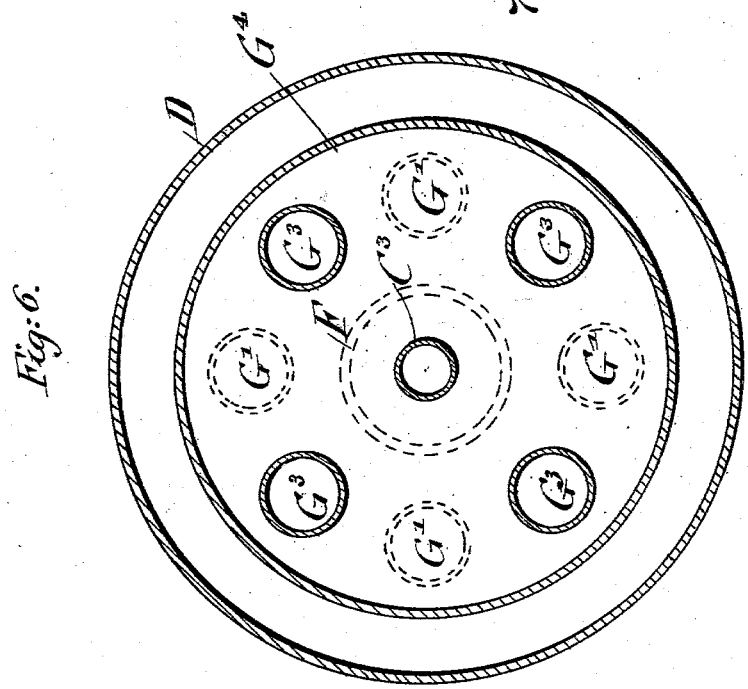
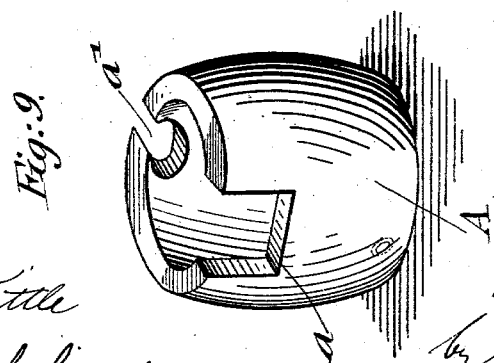
WITNESSES
John J. Kittle
Henry J. Suhrbier
INVENTOR
Louis A. Steyne
by Gormex Vilas
ATTORNEYS No. 753,011.

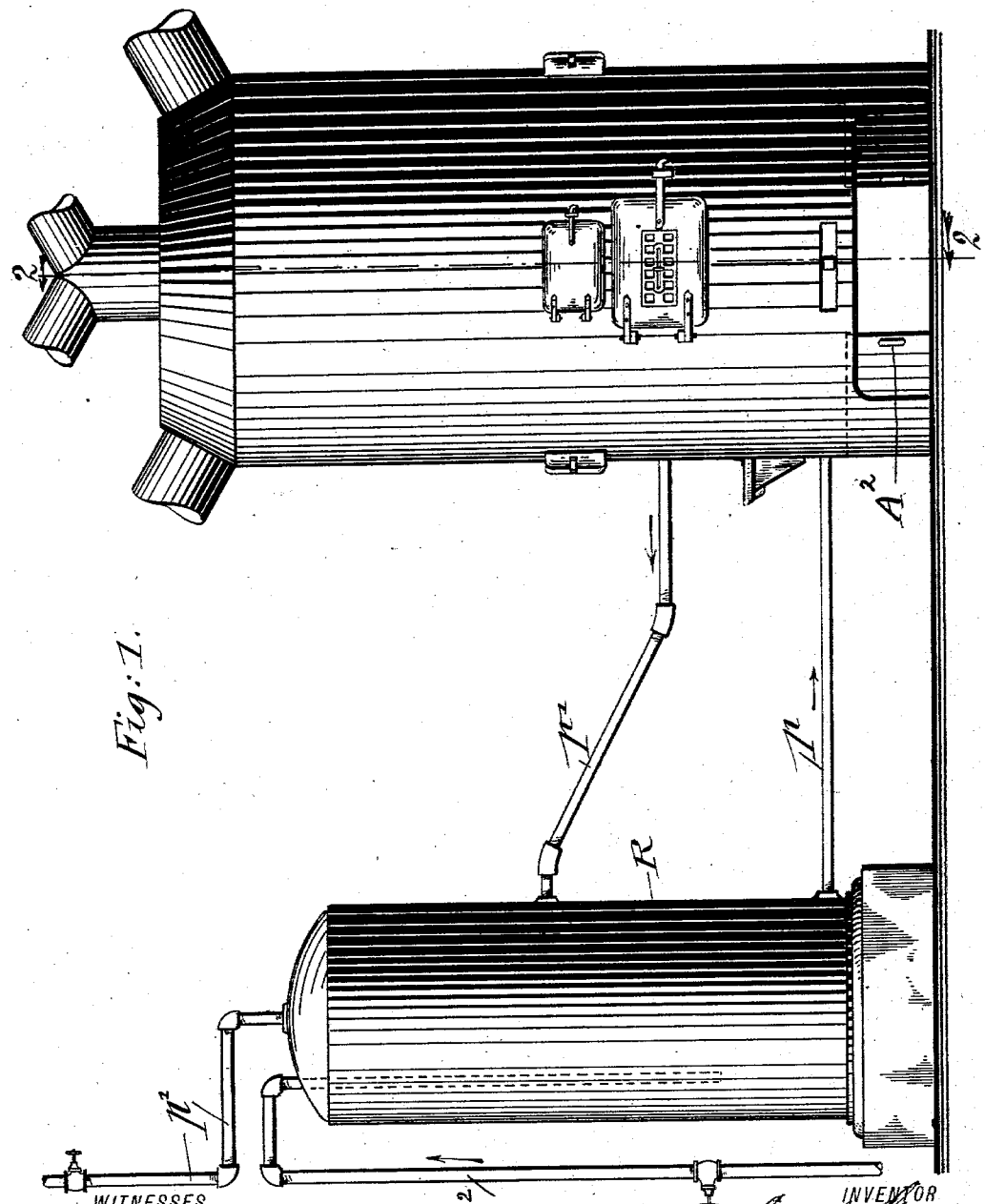

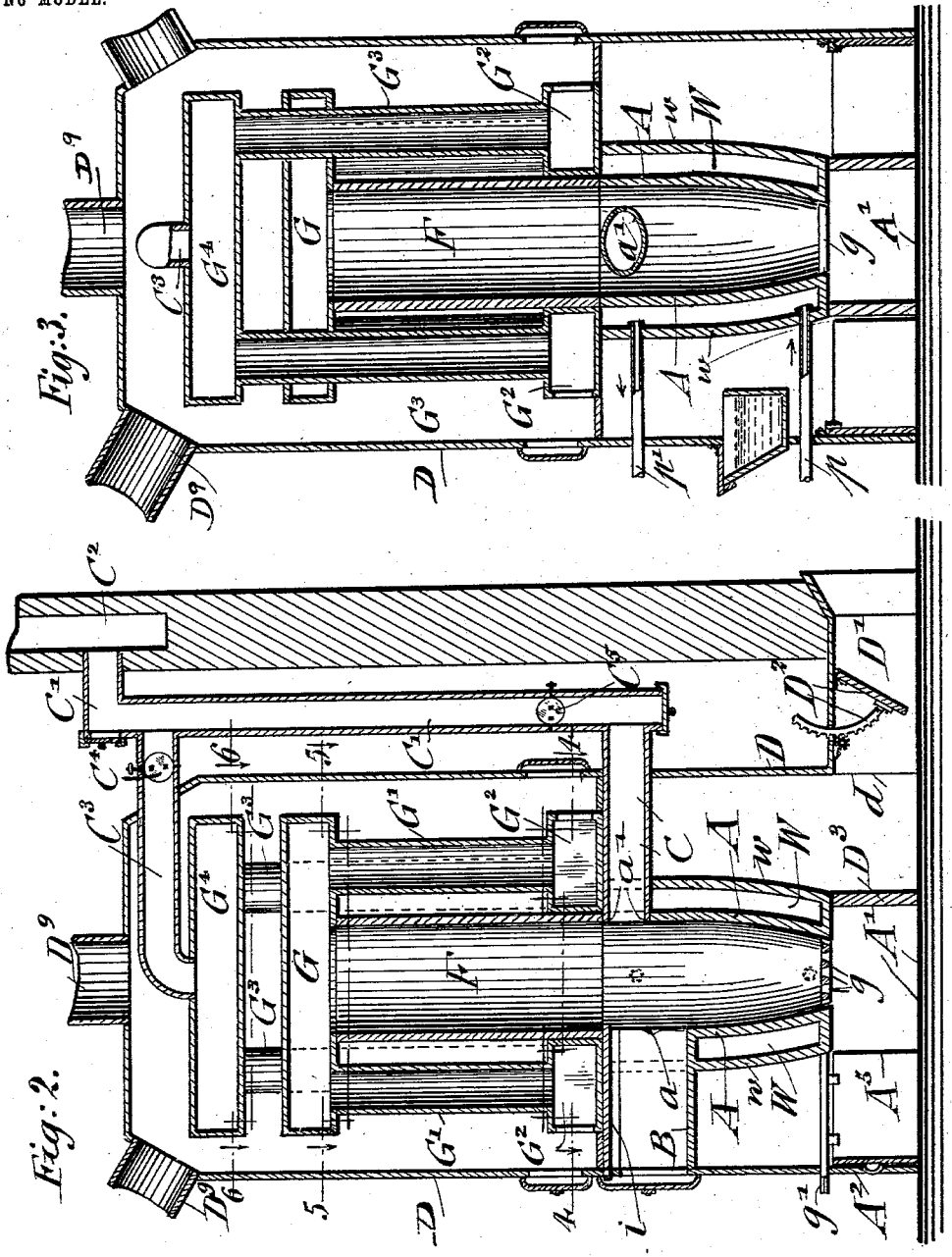

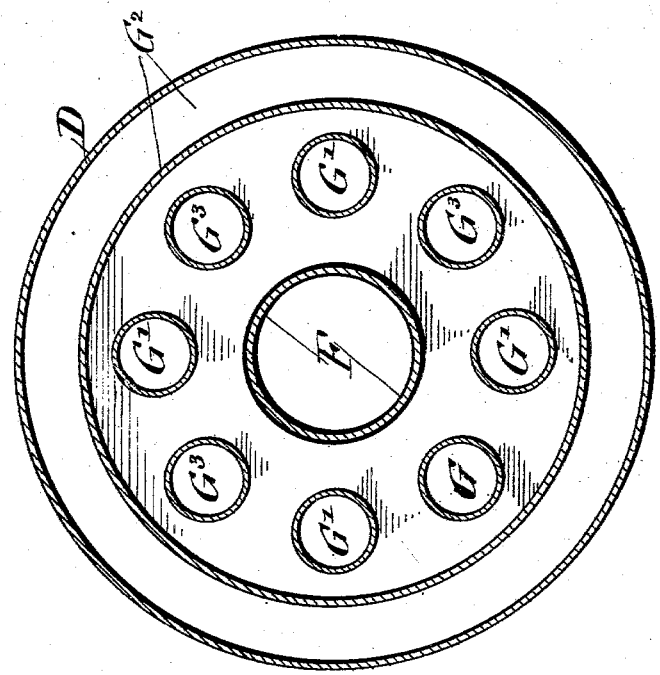
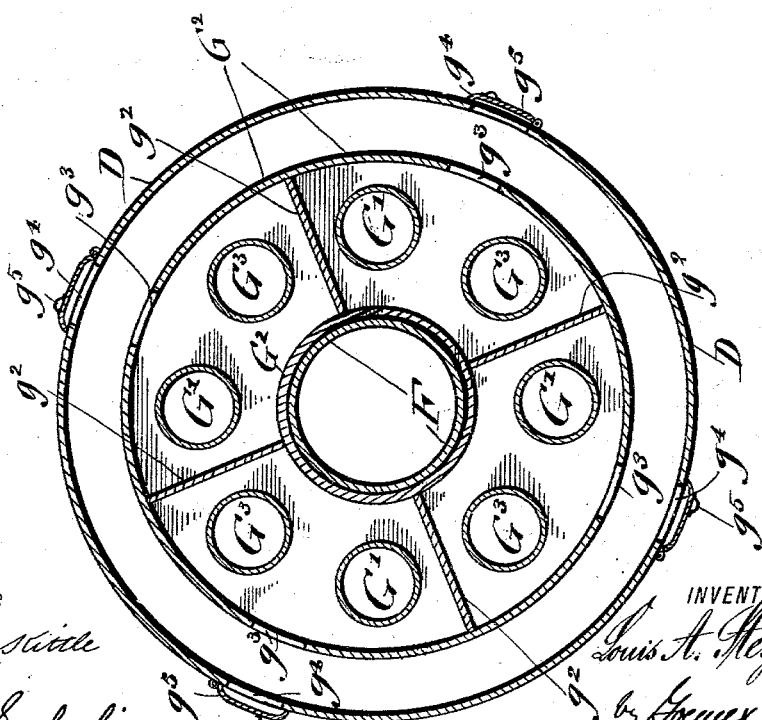

Patented February 23, 1904.

UNITED STATES PATENT OFFICE.

LOUIS A. STEYNE, OF NEW YORK, N. Y.

HOT-AIR AND HOT-WATER FURNACE.

SPECIFICATION forming part of Letters Patent No. 753,011, dated February 23, 1904.

Application filed September 18, 1903. Serial No. 173,692. (No model.)

*To all whom it may concern:*

Be it known that I, LOUIS A. STEYNE, a citizen of the United States, residing in New York, borough of Manhattan, and State of New York, have invented certain new and useful Improvements in Hot-Air and Hot-Water Furnaces, of which the following is a specification.

In a great many apartment and other houses that are heated by hot-air it was customary heretofore to have a separate hot-water heater in the basement by which hot water was supplied throughout the year to the various apartments, whether the hot-air furnace was in use or not. This required two separate fireplaces and a considerable consumption of coal.

The object of this invention is to furnish a combined hot-air and hot-water furnace in which during the winter season hot air and hot water can be supplied from one furnace to the different apartments of the building, while during the warm season the hot-air furnace can be shut off and the heating of the hot-water portion continued, so as to supply hot water all the year round; and for this purpose the invention consists of a combined hot-air and hot-water furnace which comprises a circular water-back, means for supplying fuel to said water-back, a cylindrical extension of the interior wall of the water-back, a series of downwardly-extending flues connecting the upper end of the cylindrical extension with an annular chamber at the lower end of the same, a series of upwardly-extending flues connecting the annular chamber at the lower part of the combustion-chamber with a top annular chamber above the cylindrical extension, a pipe connecting the combustion-chamber with the chimney, a second pipe connecting the top annular chamber with the chimney, a casing surrounding the water-back, flues, and chambers, said casing being provided with an air-opening and with flues at its upper end for supplying the heated air to the different apartments to be heated.

The invention consists, secondly, of the combination, with the water-back and the cylindrical extension of the same, of a horizontally-guided slide by which the combustion-chamber is closed at will from its extension, so as to permit the heating of the water-back independently of the heating-flues for the hot air; and the invention consists, further, of radial partitions in the lower heating-chamber extending from the extension to the outer wall of the lower heating-chamber for permitting the products of combustion to circulate through the flues connected with the compartments formed by these partitions; and the invention consists, lastly, of certain details of construction and combinations of parts, which will be fully described hereinafter and finally pointed out in the claims.

In the accompanying drawings, Figure 1 represents a side elevation of my improved combined hot-air and hot-water furnace as connected with a cold-water supply and hot-air reservoir. Fig. 2 is a vertical transverse section through the furnace on line 2 2, Fig. 1. Fig. 3 is a vertical transverse section also through the furnace, taken at right angles through the plane of the section shown in Fig. 2. Figs. 4, 5, and 6 are horizontal sections of the furnace respectively on lines 4 4, 5 5, and 6 6, Fig. 2. Figs. 7 and 8 are detail sections, being respectively a horizontal section and a vertical transverse section, showing the slide-plate for cutting off the hot-air portion of the furnace from the hot-water section of the same; and Fig. 9 is a detail perspective view of the fire-pot, drawn on a smaller scale.

Similar letters of reference indicate corresponding parts.

Referring to the drawings, A represents a fire-pot, which is surrounded by double walls $w$, closed at the top and bottom and forming with the same a water-back W. The fire-pot is further provided with a recess $a$ at the front portion of the same, so as to provide for a chute B for coal or other fuel. At a point diametrically opposite to the feed-chute B is arranged an oval opening $a'$ in the walls of the water-back W for inserting the lower stovepipe C, which pipe communicates outside of the inclosing casing D with a vertical pipe C', which is connected at its upper end with the chimney $C^2$. The fire-pot A is made in one integral casting of suitable thickness. The interior circular wall of the water-back W forms the combustion-chamber proper and is of less diameter at the lower end than at the upper end. The usual dumping-grate $g$ is arranged at the lower end of the combustion-chamber, so as to permit the ready removal of the ashes or cinders from the interior of the fire-pot. The grate is dumped from the front end of the furnace by means of a rod $g'$ in the usual well-known manner. Below the combustion-chamber is arranged the usual ash-pit A', in which may be arranged a sliding ash-box $A^5$. The ash-pit is open at the front and provided with sliding doors $A^2$, having the usual registers for supplying air for the combustion of the fuel in the furnace. At the bottom of the exterior casing D is arranged an inlet-opening $d$ for the air to be heated. The inlet-opening $d$ may be connected by a cold-air flue with a window or other cold-air supply or opening in the wall of the building, so as to take in a supply of cold air from the outside. In the air-flue D' is arranged an adjustable damper $D^2$, by which the supply of cold air to the interior of the casing D is regulated in the usual manner. The water-back W is supported by a semicircular partition-wall $D^3$, which extends by parallel side walls at both sides toward the front opening of the ash-pit, so as to shut off the ash-pit from the space between the water-back and the casing through which the cold air is supplied.

On the fire-pot or combustion-chamber A is supported a cylindrical extension F for conducting the products of combustion in upward direction. Above the upper end of the fire-chamber F is arranged a circular chamber G, which is concentric with the extension and the exterior casing D and of a diameter intermediately between the diameter of the extension and the exterior casing. The cylindrical chamber G is provided at its bottom with a number of openings that are arranged equidistantly from each other and from the center of the extension F, every second or alternating opening being connected by downwardly-extending flues G' with corresponding openings in the top part of a second cylindrical chamber $G^2$, which is supported on the top of the water-back, as shown in Figs. 2 and 3, the lower chamber $G^2$ being of the same size as the upper chamber G and provided with a closed bottom. From the lower chamber $G^2$ extends between the downwardly-extending flues G' upwardly-extending flues $G^3$, (shown most clearly in Fig. 3,) which pass through the intermediate openings in the bottom of the upper chamber G and through openings in the top of the same, which openings are located vertically above the corresponding openings in the top of the bottom chamber $G^2$. The upwardly-extending pipes $G^3$ terminate in a third cylindrical chamber $G^4$, which is supported at the upper ends of the flues $G^3$ and which is provided with bottom openings corresponding to the number of upwardly-extending flues $G^3$. At the center of the upper side of the top chamber $G^4$ is arranged an opening through which the products of combustion pass after having passed through the downwardly-extending flues G' into the lower chamber $G^2$ and through the upwardly-extending flues $G^3$ into the uppermost chamber $G^4$, which opening is connected by a second smoke-pipe $C^3$ with the vertical smoke-pipe C' and then with the chimney $C^2$. The smoke-pipe $C^3$, as well as the vertical smoke-pipe C', is provided with adjustable dampers $C^4$ and $C^5$ in the usual manner. In the lower chamber $G^2$ are arranged a number of radial partitions $g^2$, which are clearly shown in Fig. 4, which divide the lower chamber G' into a number of compartments, in each of which are located two flues—one downwardly-extending flue G' and one upwardly-extending flue $G^3$. The compartments cause an efficient circulation of the products of combustion. In the drawings eight vertical flues are shown—four downwardly-extending flues G' and four upwardly-extending flues $G^3$; but it is obvious that a larger or smaller number of flues can be used, if desired, there being as many partitions and compartments formed by the same as the total number of flues divided by two. The system of chambers and flues and the water-back is surrounded by the casing D, provided at its upper part with flues $D^9$ for conducting the heated air to the various apartments.

In the outer cylindrical wall of the lower chamber $G^2$ are arranged openings $g^3$, one for each compartment, which register with corresponding openings $g^4$ in the outer casing D. The outer openings $g^4$ are closed by means of hinged or sliding doors $g^5$. The openings obviate the necessity of taking the furnace apart from time to time when cleaning the accumulation of ashes, cinders, &c., deposited therein.

The water-back W is connected, by means of pipes $p$ $p'$ in openings in the exterior wall of the water-back, one at a point near the upper part for conducting away the hot water, and the other at a point near the lower part of the same for the supply of cold water, with a reservoir R, which is located near the furnace and which is of a size corresponding to the quantity of water to be supplied to the different apartments of the building. The reservoir R is connected in the usual manner with the cold-water-supply pipe $p^2$, that extends from the top of the boiler to some distance into the interior of the same, as shown in Fig. 1. The hot-water pipe $p'$ passes through the upper part of the reservoir R and imparts by radiation heat to the cold water in the reservoir.

As long as the furnace is in use for supplying hot air to the apartments in the building the hot water can be supplied from the water-back without requiring any extra hot-water furnace. It is necessary to make provision for using the combustion-chamber and waterback during the time the hot-air furnace is not used for heating purposes. For this purpose a horizontal slide I is used, which is guided on ledges $i$ near the roof of the chute B, said slide being shown in detail in Figs. 7 and 8, it being semicircular at its inner end and straight at its outer end and made of suitable non-combustible material. At the front part of the slide I a lug $i^5$ or other projection is arranged by which the slide I can be taken hold of and pushed in or drawn out on the side edges of the chute B. When the slide is in open position, it is up against the roof of the feed-chute, and the front edge of the same is in line with the wall of the casing D. For operating the slide it is necessary to open the door of the feed-chute. The slide I is during the months when the hot-air furnace is not used pushed inwardly, so as to separate the cylindrical extension F from the fire-pot A, and so prevents the products of combustion from being conducted through the system of flues arranged around the extension and causes the same to pass directly through the lower smoke-pipe C to the chimney $C^7$. When the furnace is used for hot-water heating alone, it is necessary to keep the damper $C^5$ in the vertical chimney $C'$ in open position, while it is necessary to close the damper $C^4$ in the upper smoke-pipe $C^3$, so as to prevent any back draft from entering. It is also necessary to cut off the supply of cold air to the furnace and the supply of hot air to the apartments. When both the hot-air and hot-water supply are required for use, the slide I is drawn forward again into position shown in Figs. 2 and 7, in which case the lower damper in the vertical smoke-pipe is closed and the damper in the upper smoke-pipe opened, so that the products of combustion will circulate in the manner before described through the flues and connecting-chambers to the chimney. The hot air passing around and in contact with the outer wall of the water-back, the wall of the extension, the walls of the upwardly and downwardly extending flues $G'$ and $G^3$, and the walls of the upper chamber G, lower chamber $G^2$, and top chamber $G^4$ is heated up in a very effective manner and conducted through the hot-air flues to the different apartments to be heated.

By the combination of the hot-air and hot-water furnace in one structure considerable economy in the supply of coal is obtained, and a separate structure for the hot-water supply, as heretofore in use, is dispensed with. A further advantage of combining the hot-air and hot-water supply furnaces is that a smaller space is taken up in the basement of the building and considerable time is saved, as only one furnace is to be attended to instead of two.

I claim as new and desire to secure by Letters Patent—

1. In a combined hot-air and hot-water furnace, the combination of a fire-pot, a waterback surrounding the fire-pot, a feed-chute for the fire-pot, a smoke-pipe leading from the fire-pot to the chimney, an extension on the fire-pot above the same, a system of heating-chambers and connecting-flues above and around the extension, a smoke-pipe connecting the upper heating-chamber with the chimney, a casing inclosing the fire-pot and system of heating chambers and flues, and a slide-plate arranged to cut off the fire-pot from the said extension, substantially as set forth.

2. In a combined hot-air and hot-water furnace, the combination of a fire-pot, a cylindrical extension supported above the fire-pot, an upper chamber connected with the upper end of the extension, a lower chamber supported on the fire-pot, a top chamber above the upper chamber, a series of downwardly-extending flues between the upper and lower chambers, a system of upwardly-extending flues, between the lower chamber and the top chamber, said flues passing through the upper chamber, a smoke-pipe connecting the top chamber with the chimney for conducting off the products of combustion, and an exterior casing surrounding the fire-pot and the systems of air-heating chambers and flues and provided with air-flues for conducting the hot air to the apartments to be heated, substantially as set forth.

3. In a combined hot-air and hot-water furnace, the combination of a fire-pot, a waterback surrounding the fire-pot, a smoke-pipe connecting the fire-pot with the chimney, a cylindrical extension supported above the fire-pot, an upper chamber connected with the upper end of the extension, a lower chamber supported on the water-back, a top chamber above the upper chamber, a series of downwardly-extending flues between the upper and lower chambers, a system of upwardly-extending flues between the lower chamber and the top chamber, said flues passing through the upper chamber, a smoke-pipe connecting the top chamber with the chimney for conducting the products of combustion to the chimney, and a horizontally-guided slide-plate adapted for separating the fire-pot from the extension so as to permit the independent use of the fire-pot for hot-water heating, substantially as set forth.

In testimony that I claim the foregoing as my invention I have signed my name in presence of two subscribing witnesses.

LOUIS A. STEYNE.

Witnesses:
 PAUL GOEPEL,
 C. P. GOEPEL.